United States Patent [19]

Nagamachi

[11] Patent Number: 5,657,828
[45] Date of Patent: Aug. 19, 1997

[54] MOTOR-DRIVEN CART

[75] Inventor: Sakae Nagamachi, Ise, Japan

[73] Assignee: Shinko Denki Kabushiki Kaisha, Tokyo-to, Japan

[21] Appl. No.: 507,910

[22] Filed: Jul. 27, 1995

[30] Foreign Application Priority Data

Jul. 29, 1994 [JP] Japan .................................. 6-196243
Oct. 31, 1994 [JP] Japan .................................. 6-288588

[51] Int. Cl.$^6$ .......................... B62D 51/04; B62D 1/24
[52] U.S. Cl. ........................... 180/19.3; 180/6.5; 180/168
[58] Field of Search ................................ 180/19.1, 19.3, 180/6.48, 6.5, 332, 333, 167, 168

[56] References Cited

U.S. PATENT DOCUMENTS

| | | | |
|---|---|---|---|
| 2,514,606 | 7/1950 | Jenny | 180/333 X |
| 2,565,293 | 8/1951 | Aydelott et al. | 180/333 X |
| 2,766,834 | 10/1956 | Boyer | 180/19.3 X |
| 2,962,106 | 11/1960 | Burnside et al. | 180/19.3 |
| 3,150,735 | 9/1964 | Kaufman | 180/19.3 |
| 3,565,199 | 2/1971 | Mistarz | 180/19.3 |
| 3,812,929 | 5/1974 | Farque | 180/167 |
| 3,823,791 | 7/1974 | Sheler | 180/19.3 X |
| 3,893,530 | 7/1975 | Gordon | 180/19.3 X |
| 3,976,151 | 8/1976 | Farque | 180/169 |
| 3,989,116 | 11/1976 | Hirano | 180/19.3 |
| 4,059,786 | 11/1977 | Jones et al. | 180/6.5 X |
| 4,063,612 | 12/1977 | Weiss | 180/19.2 |
| 4,347,643 | 9/1982 | Bair, III | 180/19.3 X |
| 4,645,022 | 2/1987 | Bergquist | 180/19.3 X |
| 4,646,862 | 3/1987 | Meili | 180/19.3 |
| 4,697,661 | 10/1987 | Pajerski et al. | 180/19.3 X |
| 5,180,023 | 1/1993 | Reimers | 180/167 X |
| 5,253,724 | 10/1993 | Prior | 180/6.5 |
| 5,366,037 | 11/1994 | Richey | 180/6.5 X |
| 5,375,673 | 12/1994 | McCall et al. | 180/19.3 X |
| 5,519,296 | 5/1996 | Day | 180/168 X |
| 5,540,296 | 7/1996 | Strothmann | 180/193 |

*Primary Examiner*—Kevin Hurley
*Attorney, Agent, or Firm*—Oblon, Spivak, McClelland, Maier & Neustadt, P.C.

[57] ABSTRACT

A motor-driven cart includes a manned/unmanned operation change-over switch, first and second electric motors for driving the cart, a handle lever provided to a main body of the cart to be swung to a predetermined angle with respect to a left, right, forward or backward direction, and a device for generating electric signal for steering and for speed control in response to a swing operation of the handle lever. When an operator changes the manned/unmanned operation change-over switch to its manned operation side and the handle lever is placed in its neutral zone, the motors are put in their stopped state. When the operator manipulates the handle lever in the left, right, forward or backward direction to a position outside the neutral zone, the forward or reverse rotational speeds of the first and second motors are increased in proportion to the extent of the swing operation to turn the cart to the left or right direction or to perform the forward or backward speed control. When the operator's hand is released from the handle lever, this causes the lever to be automatically returned to the neutral zone nearly in the middle of pivotal center by a restoring force of four spring members.

10 Claims, 10 Drawing Sheets

A, B: LEVER MANIPULATION DIRECTION

MOTOR-DRIVEN CART

BACKGROUND OF THE INVENTION

1. Field of the Invention

The present invention relates to electric-motor-driven carts which correspond to manual baggage/goods transportation carts but are designed to be electrically driven and more particularly, to a motor-driven cart in which forward or reverse driving forces of electric motors as auxiliary power sources are controlled in proportion to the amount of pivotal rotation of a handle lever pulled or pushed by an operator so that the operator can smoothly drive the cart at his/her own will. The present invention is also directed to a motor-driven cart which allows selection of a manual operation mode wherein the operator can manually turn the cart to a forward, backward, leftward or rightward direction and an automatic operation mode wherein the cart can be automatically (unmanned mode) run along a previously-laid route line in an easy and positive manner, as necessary.

2. Description of the Prior Art

For this type of motor-driven cart, there has been conventionally known a motor-driven cart which has such an electric driving system as shown by a circuit diagram shown in FIG. 11. In such a case, when an operator manually changes an ON/OFF switch SW1, e.g., mounted on a handle lever, this causes a forward relay F or backward relay R to be actuated so that a forward switch SWF or backward switch SWR can be changed from their contact position with terminal n to contact terminal p respectively, thus causing starting or stopping of a motor M and drive the cart forward or backward.

A manual speed signal switch SWV for adjusting the rotational speed of the electric motor M is connected to a controller 1, so that an operation of the signal switch SWV enables the operator to adjust the rotational speed of the electric motor M.

Conventionally known motor-driven carts so far used on golf courses generally include types (i) and (ii) as follows.

(i) A cart for carrying golf bags of two to four golf players thereon which can be driven under remote control by a caddy.

(ii) A vehicle on which a caddy places golf bags and driven by the caddy riding thereon.

Meanwhile, there has not existed so far such a motor-driven unmanned and manned cart that carries a golf bags for one or two golf players.

However, such a prior art motor-driven cart as shown in FIG. 11 has had the following problems because all of the motion of starting and stopping of the motor for forward or backward moving of the cart as well as the selection of the speed of the motor must be controlled by operating the manual switch.

(1) It is difficult to freely move the motor-driven cart as the operator likes.

(2) It is difficult for the operator to smoothly control the cart because the cart tends to be driven too fast or too slow against operator's will.

Further, such a prior art golf bag conveyance cart as mentioned above has been defective in the following points (3) to (5).

(3) The unmanned cart for carrying golf bags of two to four golf players is designed to automatically convey the golf bags on a remote control basis usually along a previously laid route line outside of the fairways of golf courses. In such a type of motor-driven cart, however, the weight of the cart itself with golf bags tends to undesirably leave wheel traces in the fairways, for such reason it was impossible to run the cart in the fairways.

Therefore, when the caddy is asked to take out a necessary golf club from the golf bag during the play, it is necessary for the caddy to stop the motor-driven cart once on the route line and to manually carry the desired club up to the golfer per each time when required.

(4) When the motor-driven cart is of such a type that the caddy rides on the cart and drives it to carry the golf bags, the cart has to be made large in size, thus it leads to an increased cost and the weight of the cart becomes additionally heavier by the weight of the caddy. Thus, it is impossible to drive the motor-driven cart into the fairways, and therefore, as mentioned, the caddy himself or herself must carry a desired golf club up to the golfer's site.

(5) Recently many golf courses suffer from a shortage of the number of caddies and golf club owners also try to reduce the number of caddies for cutting personnel expense and trying to introduce alternative facilities. With such alternative, however, it is impossible to decrease the number of caddies. In addition, such a manual type cart that the player must manually mount his or her golf bag on the cart and carry it by pulling or pushing is not welcomed by most players, due to poor serviceability.

SUMMARY OF THE INVENTION

It is accordingly an object of the present invention to provide a motor-driven cart usuable both as manned and unmanned for carrying various kinds of loads and which can be smoothly moved fully at operator's will and can be readily driven to a desired place.

Another object of the present invention is to provide a motor-driven cart or carriage which is suitable for carrying loads, particularly a motor-driven cart for carrying golf bags on golf courses.

In accordance with an aspect of the present invention, the above objects are attained by providing a motor-driven cart which comprises electric motor(s) for driving the wheels of the cart and means for generating an electric signal in operative response to a swing action applied to a handle lever attached on a main body of the cart swingably operable at least in forward and backward directions, wherein, when the handle lever is at its neutral position zone (which will be referred to merely as the neutral zone, hereinafter) the motors are put in their stopped state, while, when the handle lever is swung to a position over the neutral zone, the motor(s) rotational speeds are increased in a forward or reverse direction in response to the direction and the extent of swing of the handle lever.

In accordance with another aspect of the invention, there is provided a motor-driven cart which comprises a first and a second electric motors for driving driving wheels of the cart; a handle lever disposed on a main body of the cart to be pivoted by a predetermined angle in a left, right, forward or backward direction and obliquely right or left in both forward and backward directions and means for generating an electric signal for steering and an electric signal for performing speed control in response to a pivotal operation of the handle lever, wherein, when the handle lever is at its neutral position or zone, the first and second motors are put in their stopped state, while, when the handle lever is pivoted in the left, right, forward or backward and any other desired directions to a position outside the neutral zone, the first and second motors are increased in their rotational speeds in a forward or reverse direction in response to the direction and the extent of pivotal operation in the handle lever to carry out speed control of the cart in the left, right, forward, backward and any other desired directions.

In this case, the handle lever is equipped with a spring, so that the handle lever can be swiveled in a positive or negative direction against a restoring force of the spring when such an external forces as a pulling or pushing force is applied, and that the handle lever is kept in the neutral zone present nearly in the middle of the swivel point of the lever under the restoring force of the spring when no such external force is applied. Further, the handle lever is supported by four spring arranged to surround the handle lever, whereby the handle lever is subjected to an external force to move in a positive or negative direction against a restoring force of springs when the handle lever is pivoted in the left, right, forward, backward or any other desired directions, and the handle lever is returned to the neutral zone nearly in the middle of the pivotal rotation of the lever by the restoring force of the springs when no such external force is applied.

It is also desirable that switching of the motors between the forward and reverse rotations is carried out by forming a circuit for forward or reverse rotation of the motors, by means of affecting elements for forward and backward motion which are operated in response to the positive or negative pivotal motion of the handle lever exceeding the neutral zone.

It is also desirable that the positive or negative electric signal is generated by increasing or decreasing resistive values of variable resistors being mechanically and electrically connected to the handle lever depending upon the magnitude of positive or negative rotation in the lever.

Further, the motor-driven cart further comprises, a guide sensor, a forward obstacle sensor, a manned/unmanned operation change-over switch, so that, by the operator's changing of the manned/unmanned operation change-over switch to its unmanned operation side and puts the motor-driven cart on a previously-laid route line, the motor-driven cart can run at a predetermined speed along the route line under manipulation of directional control of the guide sensor; so that, when the forward obstacle sensor detects presence of an obstacle such as another motor-driven cart stopped forward of the route line, the motor-driven cart stops at a predetermined distance from the obstacle; and so that, when the operator changes the manned/unmanned operation change-over switch to its manned operation side, the motor-driven cart can be moved to an arbitrary place away from the route line by the operator's pivotal manipulation of the handle lever.

The means for generating the electric signals for both steering and for speed control in response to a pivotal operation of the handle lever may include joystick mechanism for actuating two variable resistors $VR_1$ and $VR_2$ by means of operating direction and the operating force and steering control generates the electric signals on the basis of signals issued from a steering control circuit and a motor control signal generator in response to said joystick mechanism, or further a signal generator which generate a signal based on a signal from the forward obstacle sensor.

BRIEF DESCRIPTION OF THE DRAWINGS

FIG. 6 shows an exemplary structure of a joystick mechanism in the second embodiment, wherein

DESCRIPTION OF THE PREFERRED EMBODIMENTS

The present invention will be explained in connection with first to third embodiments of the invention with reference to FIGS. 1 to 10.

(Embodiment 1):

Explanation will now be made on the first embodiment of the present invention by referring to FIGS. 1 to 4.

The first embodiment shows a type where an electric cart or conveyor of the present invention is used as a hand-operated electric cart for carrying golf bags and thus in this embodiment, the motor driven cart will be explained as referred to the hand-operated electric cart.

Figure 2:
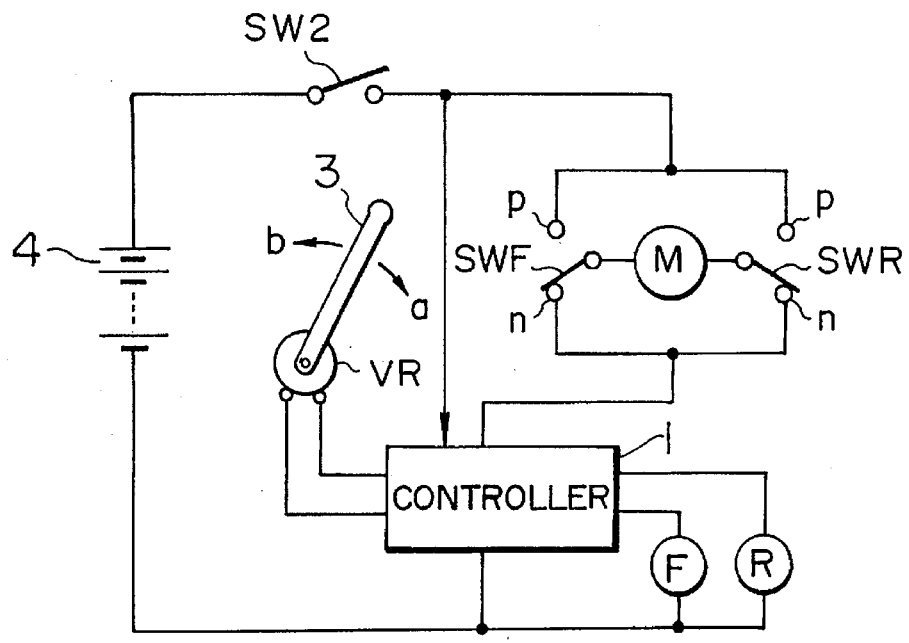
FIG. 2 is a circuit diagram, in block diagram form, of the first embodiment.

In FIG. 2, constituent parts, members or elements having substantially the same functions as those used in the prior art of FIG. 71 are denoted by the same reference numerals and symbols therein, and the explanation thereof is omitted.

Figure 1:
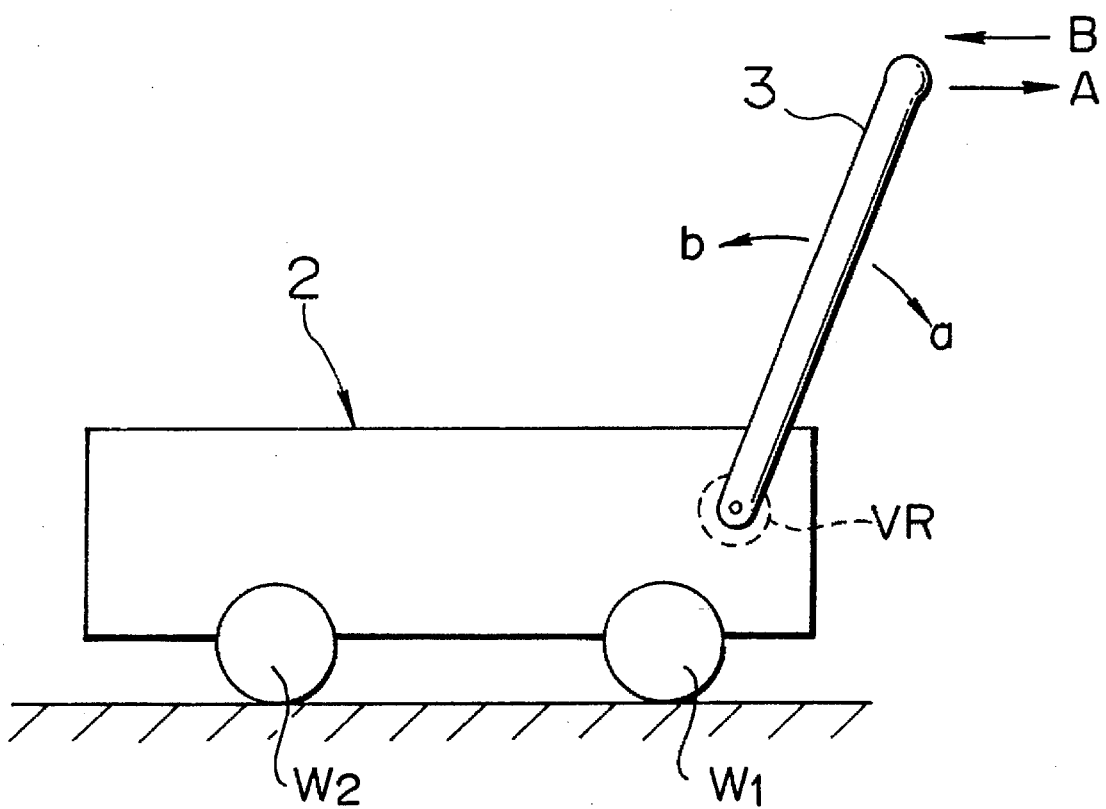
FIG. 1 is a side view showing a schematic configuration of a motor-driven cart in accordance with a first embodiment of the present invention.

Turning now to FIG. 1, there is shown an outside appearance of a hand-operated electric cart 2 in accordance with the first embodiment of the present invention, the structure of which will be explained below.

In the drawing, a handle lever 3 is pivotably supported in the base of the hand-operated motor driven cart 2 through a relatively strong spring (not shown), so that, when an operator pulls the handle lever 3 in a direction shown by an arrow A or pushes it in a direction opposed to the direction A as shown by an arrow B, this makes the handle lever 3 to be rotated around its pivotal center axis in a direction shown by an arrow a or b respectively against the restoring or returning force of the spring.

Accordingly, when the operator takes his hand off from the handle lever 3, the returning force of the above spring means provided to the rotary shaft of the handle lever 3 causes the handle lever 3 to automatically return to its neutral position (neutral zone) and kept thereat. This neutral position also can be taken when the operator shifts the handle lever 3 to a vertical position, as a matter of course.

Reference symbols wheels $W_1$ and $W_2$ represent two pairs of running wheels of the hand-operated self-propelled cart 2, a pair of which are used as driving wheels while the other pair of wheels are driven wheels or follower wheels. It is assumed in the present embodiment that the wheels $W_1$ are used as driving wheels while the other wheels $W_2$ are used as the follower or driven wheels and that the wheels $W_1$ as driving wheels are coupled to a driving motor M, to be described later by such a coupling mechanism as an axle (not shown).

Figure 3:
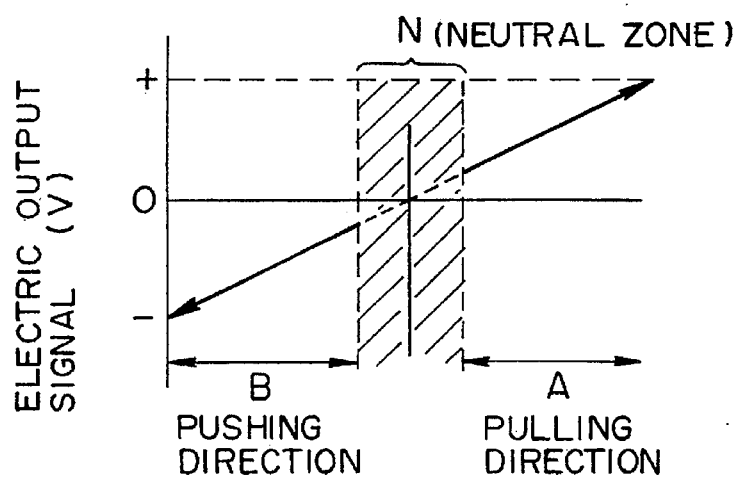
FIG. 3 is a characteristic diagram showing an electric output signal issued from a controller in the first embodiment.

As shown in FIG. 1, mechanically and electrically connected to the rotary shaft of the handle lever 3 is a variable resistor VR, which in more detail, is electrically connected to a controller 1 as shown in FIG. 2 so that, when the resistive value of the variable resistor VR is varied in response to an amount of rotation of the handle lever 3, the controller 1 correspondingly outputs such an electric signal V (output of variable resistor VR) as shown in FIG. 3.

Explanation will now be made on a case where a caddy puts a set of golf clubs in a motor driven cart 2 (which will be referred merely to as a cart, hereinafter) and drives the cart on a golf course.

Further, explanation will be made in a case where the caddy pulls the motor driven cart 2 while gripping the tip end of a handle lever 3 of the cart 2 and moves from one place to another on the golf course by pulling the cart.

When the caddy first turns a main switch SW2 ON and pulls the handle lever 3 of the cart 2 in the direction A, an output signal of the controller 1 causes a forwarding relay F to be actuated so that forward switch SWF is switched from its contact terminal position n to a contact terminal position p, whereby the controller generates a positive electric signal in such a range as shown by symbol A in FIG. 3, as the result the motor M forwardly rotates and thus the cart 2 is driven in the direction where the handle lever 3 is pulled.

When the cart has reached the place where the golf ball has been hit by the player, the caddy releases his hand from the handle lever 3, then the handle lever 3 will automatically return to its neutral zone N (hatched zone), which results in that the cart 2 loses a driving force from the motor M by means of the signal from the controller 1 and thus the cart 2 stops.

Further, when the cart comes to an uphill slope and the caddy wishes to increase the driving force of the motor M, he/she grips the handle lever 3 and pulls it large extent, thus the amount of swing motion of the lever 3 automatically increases.

In other words, this increases the value of the electric signal in the range A of FIG. 3 in its positive direction and therefore increases the rotational speed (driving force) of the electric motor M under control of the controller 1. Therefore, even where the uphill slope is steep, the caddy considers the steepness and deliberately increases the pulling force of the cart 2, the auxiliary driving force of the cart 2 can be automatically increased to reduce caddy's burden.

When it is desired to move the cart 2 backwards to allow other partner player's ball stroke, the caddy pushes the handle lever 3 in the direction B. This results in a backward relay R to be actuated on the basis of a signal issued from the controller 1 so that a backward switch SWR changes its contact position from its contact terminal n to the contact terminal p. In this case, the electric output signal of the controller takes a negative value in a range B as shown in FIG. 3, with the result that the electric motor M is reversely rotated to move the cart 2 backwards.

Even in this case, when it is desired to stop the cart 2, the caddy has only to release his/her hand from the handle lever 3. Since this causes the handle lever 3 to be returned to the neutral zone N, the electric motor M and thus the cart 2 stops.

Even when the caddy pushes the handle lever 3 to drive the cart 2, the driving force is increased in proportion to the amount of rotation in the handle lever 3, which is substantially the same as when the caddy pulls the handle lever 3 to drive the cart, excepting the difference of direction of driving forces.

Figure 4:
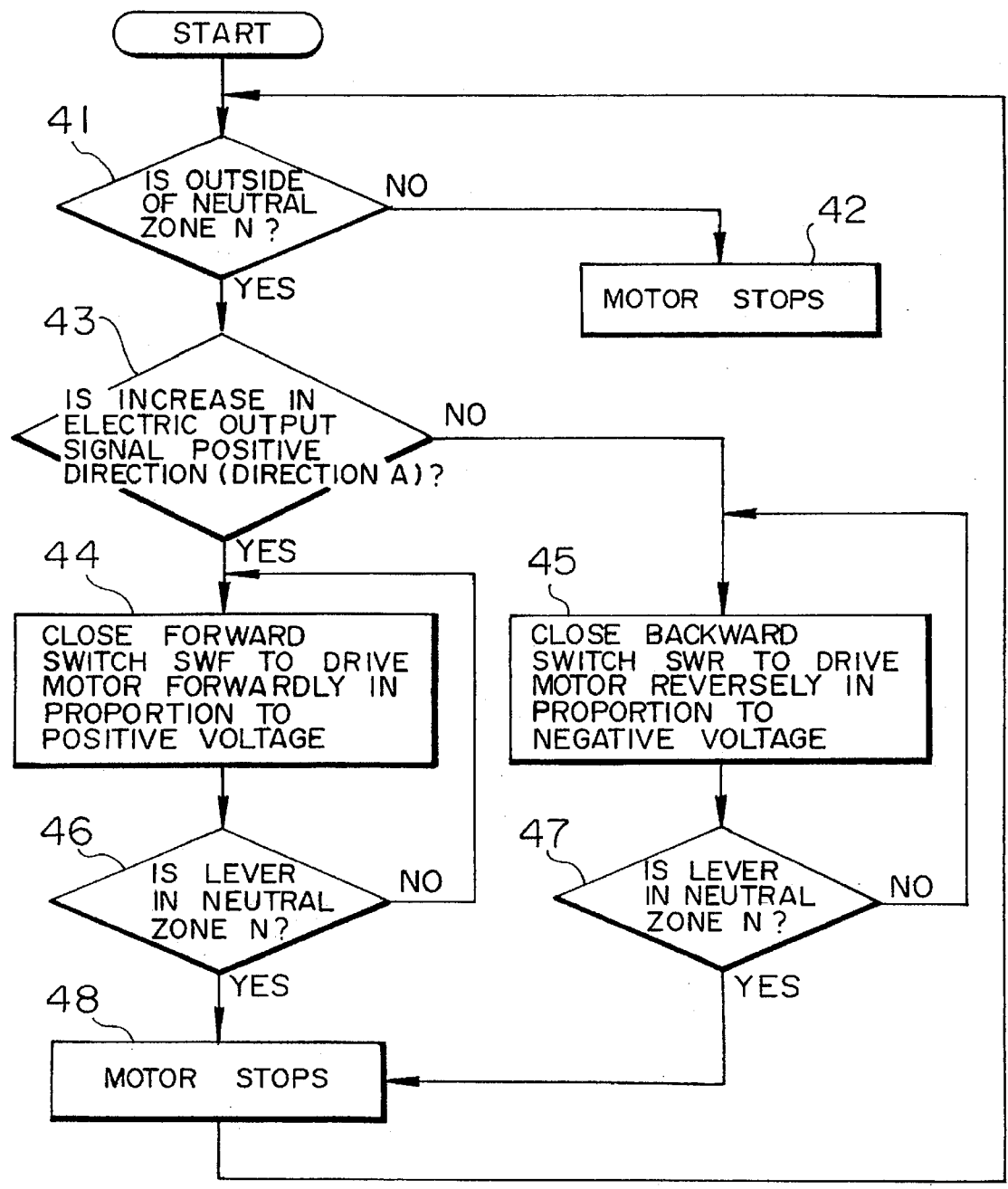
FIG. 4 is a flowchart for showing the operation of the controller according to the first embodiment.

Shown in FIG. 4 is a flowchart for explaining the operation of the controller 1 in the aforesaid first embodiment of the present invention. A relationship between FIGS. 2 and 4 will be briefly explained in conjunction with the flowchart of FIG. 4.

When the main switch SW2 in FIG. 2 is turned ON, power is supplied from a D.C. power source 4 to the controller 1 to start the flowchart of FIG. 4.

When such an operation that the handle lever 3 is pulled, it is judged whether the amount of swing of the handle lever is within the neutral zone N or not(step 41). If the extent of swing is within the neutral zone ("NO"), the electric motor M is kept at its stopped state (step 42); whereas, if the extent of swing is out of the neutral zone ("YES"), it is judged in a step 43 whether an increase in the electric output signal is in its positive direction (direction A). When it is determined "YES" in the step 43, the forward relay F is actuated in a step 44 so that the forward switch SWF is turned ON to drive the electric motor M forward, the rotational speed of the electric motor M being controlled in proportion to the magnitude of the positive voltage signal.

When the judgement of the step 43 is "NO", a backward relay R is operated in a step 45 so that the backward switch SWR is turned ON to drive the electric motor M reversely, the rotational speed of the electric motor M being controlled in proportion to the magnitude of the negative voltage signal.

In steps 46 and 47, it is judged whether the extent of swing is again within the neutral zone N.

If not, then control goes back again to the steps 44 and 45 respectively to continuously control the electric motor M.

When the neutral zone N is detected in the steps 46 and 47, the motor is placed in the stopped state in a step 48, which corresponds to a condition immediately after the controller is started. Until the main switch SW2 is turned OFF, the aforesaid mode of control of the controller 1 is repeated.

When the handle lever is operated over a wide range as mentioned above, this tends to increase the driving force of the electric motor M and thus greatly accelerate the speed of the cart, however, if the cart speed becomes faster than the caddy's walking speed, since the caddy's hand still holds the handle lever, the lever is automatically put in the neutral state, thereafter, the handle lever can be placed at its suitable swing position and therefore the cart can run following the operator's walking speed.

Although the above explanation on the first embodiment has been made in connection with the case where the motor-driven cart is used as a hand-operated electric cart for carrying golf clubs on a golf course, the motor-driven cart of the present invention is not restricted to such a specific application but may be used as other motor-driven carts for carrying goods in various fields, including, for example, a cart for transporting of parts or members in a factory and for transportation of goods or items in a supermarket.

In the foregoing embodiment of the golf clubs cart, explanation has been made on the case where the cart moves forwardly when the lever is pulled, and the cart moves backwardly when the lever is pushed. However, this can be made in such a reverse manner that the directions A and B of FIG. 3 are made in opposite direction with each other when necessary.

In the latter case, the connections of the handle lever and variable resistor are changed so that the pulled handle lever causes the backward driving of the cart while the pushed handle lever causes the forward driving of the cart.

Though omitted in the operational explanation on operation of the aforesaid first embodiment, when it is desired to move the motor-driven cart to a left or right direction, such running in left or right direction can be manually achieved by the operator by adding a pulling or pushing force toward the left or right while keeping the handle lever 3 at its forward or backward position. In place of this, the operator may change the running direction of the cart by lifting the cart body.

(Embodiment 2)

Explanation will next be made on a second embodiment of the present invention with reference to FIGS. 5 to 8. First, explanation will be directed to the schematic control arrangement and outside appearance of a motor-driven cart in accordance with the present invention which is used as a cart for transporting a golf bag for a single player, by referring to FIGS. 5 to 8.

Figure 5:
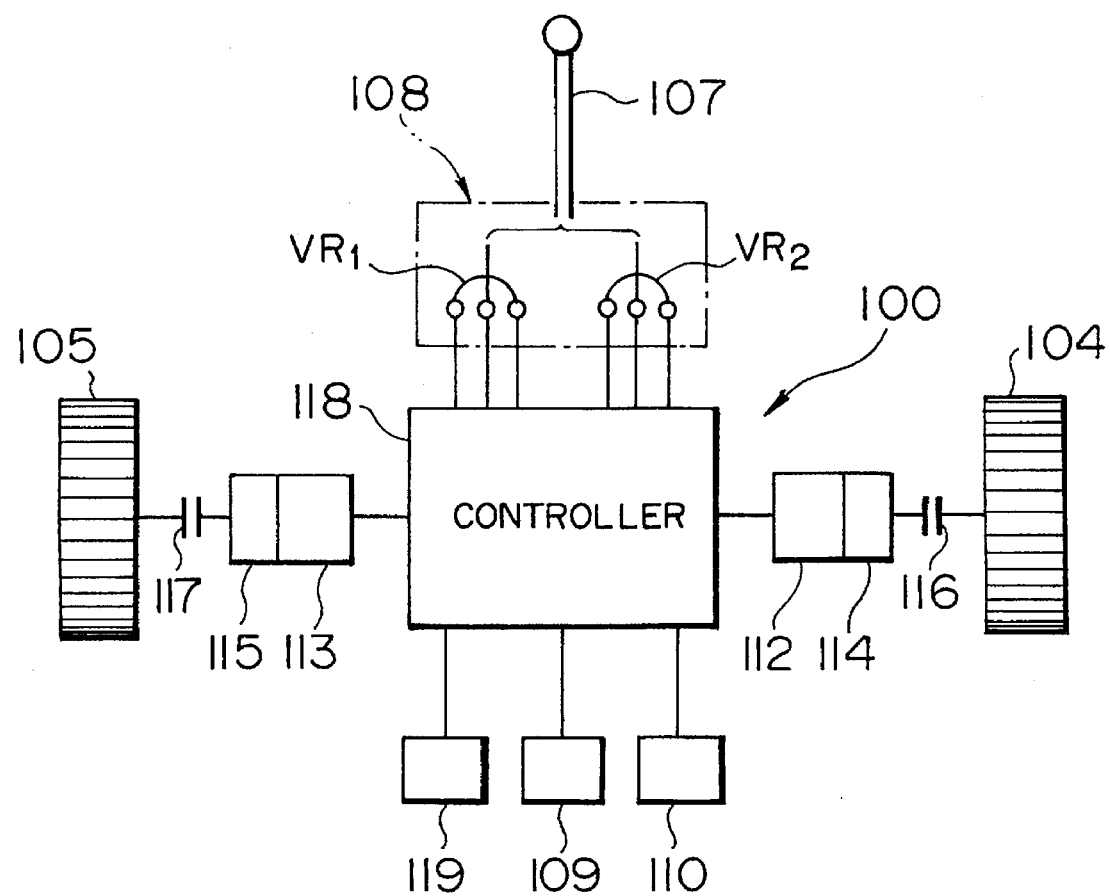
FIG. 5 is a connection diagram showing both a major part of a motor-driven cart in accordance with a second embodiment of the present invention and a schematic arrangement of a control circuit thereof.
Figure 8A:
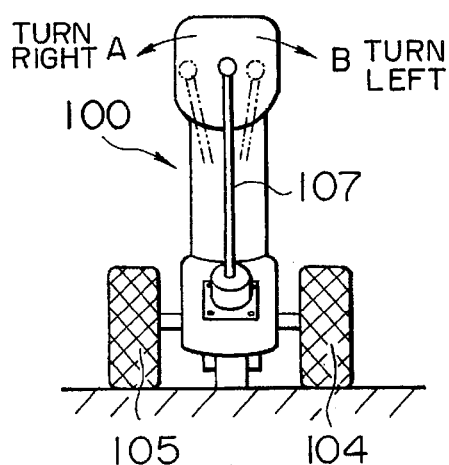
FIG. 8 shows an outside appearance of the motor-driven cart of the second embodiment, wherein (A) and (B) are front and side views of the cart, (C) is a plan view of a major part of a mechanism of the cart associated with wheels, and (D) is a characteristic diagram showing a relationship between the extent of pivotal motion of the handle lever and output electric signal.
Figure 8B:
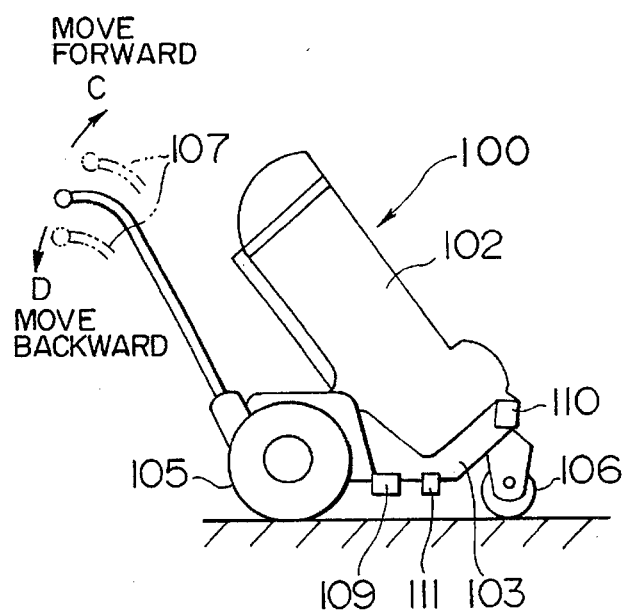
Figure 8C:
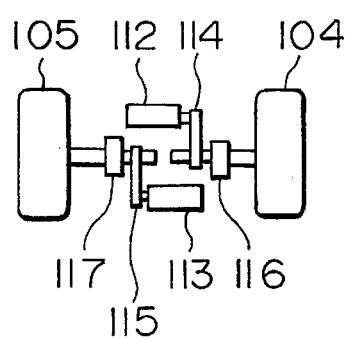
Figure 8D:
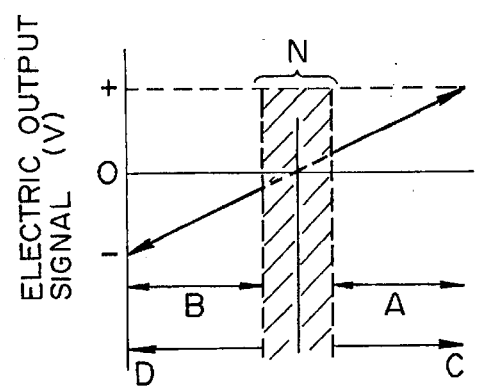

FIG. 5 is a schematic arrangement of the cart, FIG. 8(A) and (B) show front and side views of the same respectively, FIG. 8(C) is a plan view of a major part of the same associated with wheels, and FIG. 8(D) shows a characteristic diagram showing a relationship between the handle lever and the electric output signal of the controller.

In FIG. 5 and FIG. 8(A) and (B), reference numeral 100 denotes a motor-driven cart, 102 a golf bag, 103 a cart 103 for carrying the golf bag 102 thereon, 104 and 105 first and second wheels as driving wheels respectively, and 106 a follower wheel such as a caster.

A handle lever 107 is mounted to a joystick mechanism 108 provided in a base of a main body of the hand-operated electric cart 100 so that, when an operator operates the handle lever 107 in a left, right, forward or backward direction, the hand-operated electric cart 100 can be controllably driven toward the operated direction of the handle lever 107.

The joystick mechanism 108 includes not only a first variable resistor $VR_1$ for steering control and a second variable resistor $VR_2$ for speed control as shown in FIG. 5 but also a coupling mechanism (not shown in the drawing) to the handle lever 107, which structure will be explained later with use of FIG. 6.

Reference numeral 109 denotes a guide sensor for unmanned running, 110 a forward obstacle sensor, 111 a sensor for detecting a stopped position. The stopped-position detecting sensor 111, which comprises, e.g., a magnetic sensor, may be provided when necessary as in the case of a leading cart.

Reference numeral 112 denotes a first motor for driving a first wheel 104 (which motor will sometimes be referred to as the first motor $M_1$, hereinafter), 113 a second motor for driving the second wheel 105 (which motor will be sometimes referred to as the second motor $M_2$, hereinafter), 114 and 115 gear mechanisms respectively.

Clutches 116 and 117 are designed so that, when the operator desires to manually push or pull the motor-driven cart 100 when its controller 118 becomes faulty, and it is required that the clutches 116 and 117 can be separated from engagement with the associated gear mechanisms 114 and 115. Numeral 118 denotes a controller, which controller 118 incorporates a steering control circuit 128, a motor control signal generator 129 and so on, which circuit diagram will be detailed later with reference to FIG. 7.

Numeral 119 is a D.C. power source such as a battery for the controller 118.

The structure of the joystick mechanism 108 will next be explained by referring to FIG. 6.

Figure 6A:
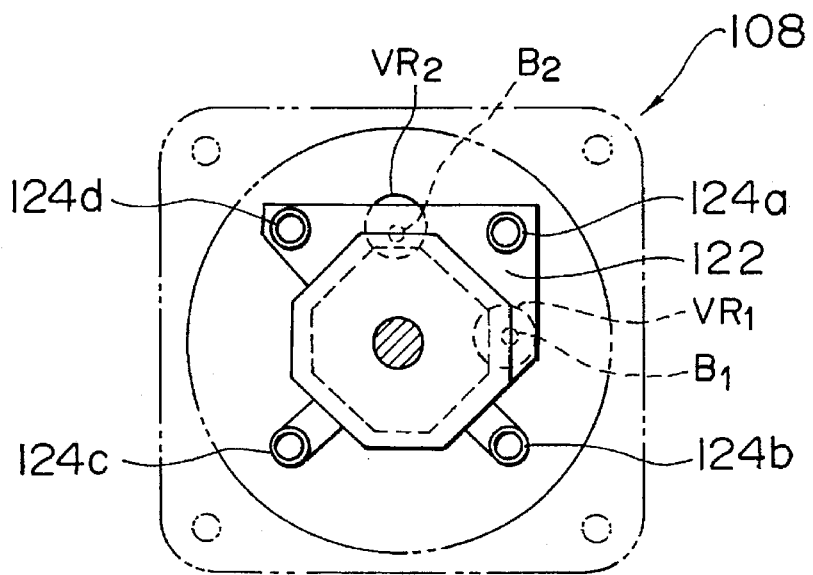
FIG.6(A) is a plan view and FIG.6(B) is a cross-sectional front view.
Figure 6B:
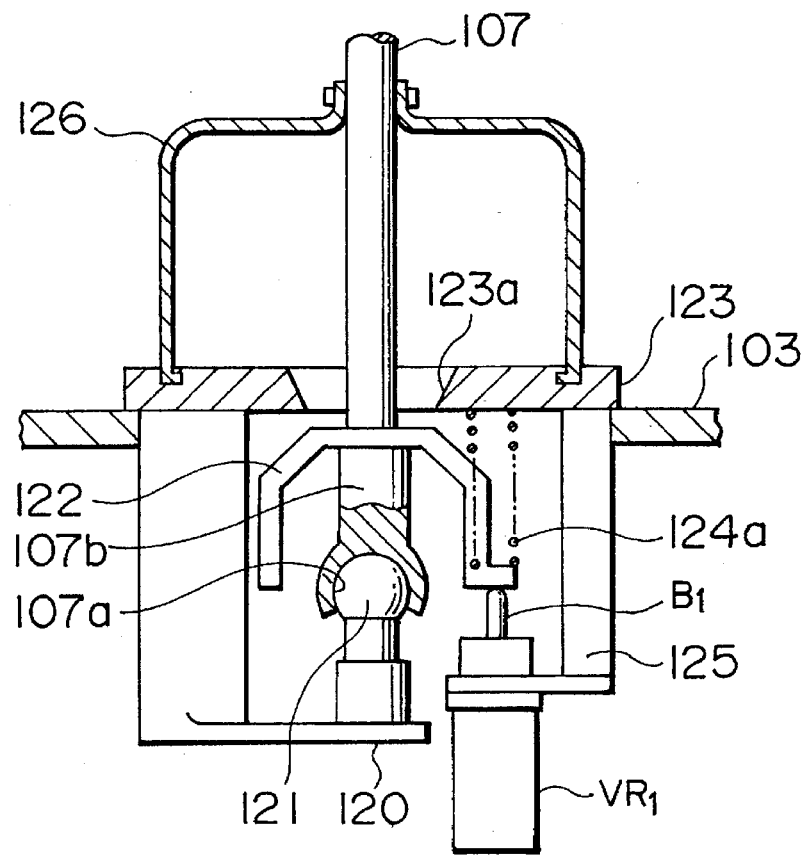

FIG. 6(A) is a plan view of the joystick mechanism 108 and FIG. 6(B) is a front, vertical cross-sectional view of the same. As shown in these figures, a lower end 107a of the handle lever 107 is formed therein with a curved indented recess which fittingly receives a spherical ball 121 projecting upwardly from a stationary part 120.

Numeral 122 is a driving-force transmitting means, which is mounted on a stepped part 107b of the handle lever 107, being urged to contact with the tip ends of adjusting rods $B_1$ and $B_2$ of the first variable resistor $VR_1$ of steering control and second variable resistor $VR_2$ of speed control under the spring forces of 4 springs 124a to 124d provided at the 4 corners of a supporting plate 123. The supporting plate 123 is received by the carrier 103.

A through hole 123a formed in the center of the supporting plate 123 in the form of a substantially-conical shape loosely receives the handle lever 107. And the diameter of the through hole 123a is selected so that the handle lever 107 can be swingably manipulated in its left, right, forward or backward direction around the spherical ball 121.

A support 125 functions to support the first variable resistor $VR_1$ to the supporting plate 123. Likewise, the second variable resistor $VR_2$ (not shown) is also supported to the supporting plate 123 by a similar support member.

A cover 128, which covers the base part of the handle lever 107, is desirably made of a resilient material such as rubber.

The handle lever 107, variable resistors $VR_1$ and $VR_2$, stationary part 120, ball 121, driving-force transmitting means, 122, supporting plate 123, a through hole 123a, springs 124a to 124d, support 125, and cover 126 as mentioned above collectively form the joystick mechanism 108.

With the joystick mechanism 108, the handle lever 107 can be swingably rotated through a desired angle around the pivotal ball 121 in desired one of forward, backward, leftward and rightward directions, and the swinging rotation of the handle lever 107 is carried out as operatively associated with the four spring means 124a to 124d. When the handle lever is swung for example in the rightward direction, this causes the adjusting rod $B_1$ of the first variable resistor $VR_1$ to be pushed thereby to generate a positive electric signal. In this case, since the springs 124a and 124b tend to expand while the springs 124c and 124d tend to be contracted, a release of operator's hand from the handle lever 107 results in that the handle lever 107 is restored to its neutral position under the influence of the restoring forces of the springs 124a to 124d. When the operator shifts the handle lever 107 in its leftward direction, exactly the opposite action to the above will take place.

In this way, when the operator releases his/her hand from the handle lever 107 or when he/she shifts the handle lever 107 to the neutral zone, the respective motors 112 and 113 stop under control of the controller 118 (to be explained later) and thus the motor-driven cart will stop. When the handle lever 107 is swung in the forward or backward direction, the second variable resistor $VR_2$ for speed control is actuated to generate a positive or negative electric signal. When the handle lever 107 is pivoted in the obliquely-forward or right direction or in the obliquely-forward left direction, on the other hand, both the variable resistors $VR_1$ and $VR_2$ are operated in response to the swing motion to thereby generate such a positive electric signal to cause the motor-driven cart to be driven in the obliquely-forward right or left direction.

Similarly, when the handle lever 107 is swung in the obliquely-backward and right direction or in the obliquely-backward left direction, the variable resistors $VR_1$ and $VR_2$ are both operated in response to the pivotal operation to thereby generate such a negative electric signal to cause the motor-driven cart to be driven in the obliquely-backward right or left direction.

By referring to FIG. 7, explanation will be made to an electric circuit showing connections of the joystick mechanism 108, controller 118, and first and second driving motors 112 ($M_1$) and 113 ($M_2$).

In the drawing, the same elements as already explained in FIGS. 5, 6 and 8 are denoted by the same reference numerals or symbols, and explanation thereof are omitted.

A change-over switch 127 has an unmanned operation terminal 127a and a manned operation terminal 127b for switching therebetween. The unmanned operation terminal 127a is connected to the guide sensor 109, whereas the manned operation terminal 127b is connected to a slide terminal of the first variable resistor $VR_1$ of steering control, respectively. The guide sensor 109 generates no output signal when the hand-operated electric cart 100 is located at the center of its route line, while the guide sensor 109, when the cart is shifted to the right or left from the route line, generates an output signal of a positive or negative level that is proportional to the shifted amount.

The steering control circuit 128 is connected at its input terminal 128a to a switching terminal 127c of the change-over switch 127 and also connected at its two output terminals 128b and 128c to two related input terminals 129a and 129b, respectively.

When the change-over switch 127 is switched to the unmanned or manned operation terminal position 127a or 127b, the steering control circuit 128 receives an output signal from the guide sensor 109 or receives an output from the first variable resistor $VR_1$ and issues a rotation signal $E_1$ or $E_2$ as a steering signal of the motor $M_1$ or $M_2$, respectively.

In other words, the steering control circuit 128 functions to apply the rotation signal $E_1$ of the motor $M_1$ from its output terminal 128b to the motor control signal generator 129, and to apply the rotation signal $E_2$ of the motor $M_2$ from its output terminal 128c to the motor control signal generator 129, respectively.

The motor control signal generator 129 has auxiliary input terminals 129c to 129h and output terminals 129j and 129k. The motor control signal generator 129 compares the signal $E_1$ received from the input terminal 129a with an output received through the auxiliary input terminal 129g from the speed detector $N_1$ and also with outputs received from other auxiliary input terminals 129d, 129e, etc., and issues to the output terminal 129j a signal to drive forwardly or reversely or stop the first motor $M_1$. Meanwhile, the motor control signal generator 129 compares the signal $E_2$ received from the input terminal 129b with an output received through the auxiliary input terminal 129h from the speed detector $N_2$ and also with outputs received from other auxiliary input terminals 129d and 129f, and issues to the output terminal 129k a signal to drive forwardly or reversely or stop the second motor $M_2$.

Accordingly, the output terminals 129j and 129k are actually made up respectively of two output terminals of, for example, two terminals through which signals are sent to transistors 131a and 131d of a first-motor control circuit 130 and the other two terminals through which signals are sent to transistors 131b and 131c of the first-motor control circuit 130. For the sake of simplification of illustration, these output terminals of the motor control signal generator 129 are illustrated respectively as a single terminal but distinguishedly illustrated as separated at lead positions to the associated transistors 131a to 131d and 134a to 134d. Of the above auxiliary input terminals 129c to 129h, the auxiliary input terminal 129c is connected to an output terminal of the forward obstacle sensor 110.

A manned operation switch 127M is operatively associated with the change-over switch 127, and is connected to the auxiliary input terminal 129d of the motor control signal generator 129 when the change-over switch 127 is changed to the manned operation terminal position 127b; whereas, the manned operation switch 127M is open-circuited when the change-over switch 127 is changed to the unmanned operation terminal position 127a.

As illustrated, 130 is a control circuit for the first-motor $M_1$ which comprises aforesaid four transistors 131a to 131d, circulation diodes $d_1$ to $d_4$, the speed detector $N_1$ for the motor $M_1$, and a current detector 132 for the motor $M_1$ having a resistance $r_1$. In the first-motor control circuit 130, when the transistors 131a and 131d are in their ON position and the transistors 131b and 131c are in their OFF position, the first motor $M_1$ is driven forwardly; whereas, when the transistors 131a and 131d are in their OFF position and the transistors 131b and 131c are in their ON state, the first motor $M_1$ is driven in reverse direction. Further, speed control is carried out with use of a signal having a level corresponding to the ON width of the transistors 131a to 131d.

A circuit 133 for controlling the second motor $M_2$, which has substantially the same arrangement as the first-motor $M_1$ control circuit 130, includes, as illustrated, aforesaid four transistors 134a to 134d, circulation diodes $d_5$ to $d_8$, the aforesaid speed detector $N_2$ of the second motor $M_2$, and current detector 135 for the second motor $M_2$ having a resistance $r_2$.

Even in this case, the forward and reverse rotations of the second motor $M_2$ as well as the speed control are, as in the first motor $M_1$, carried out by controlling the ON and OFF operations of the transistors 134a to 134d and the ON width thereof.

The auxiliary input terminals 129e and 129f of the motor control signal generator 129 receive output signals from the current detectors 132 and 135 of the motors $M_1$ and $M_2$ respectively, whereas the auxiliary input terminals 129g and 129h receive respective output signals fed back from the speed detectors $N_1$ and $N_2$ of the motors $M_1$ and $M_2$ respectively, which contributes to the speed control of the respective motors $M_1$ and $M_2$ as mentioned above.

Further, control signals issued from the output terminal 129j of the motor control signal generator 129 are discriminately applied to the bases of the transistors 131a to 131d and transistors 134a to 134d $=l$ respectively, as already mentioned above.

The steering control circuit 128, motor control signal generator 129, first-motor $M_1$ control circuit 130, and second-motor $M_2$ control circuit 133, as mentioned above collectively form the controller 118. Though the controller has been made up of the above circuit means in the present embodiment, it goes without saying that the functions of these means may be implemented in accordance with a computer program of such an arithmetic operation means as a microcomputer.

A relationship between the handle lever 107 of the joystick mechanism 108 and the controller 118 as partially explained so far will be explained below in connection with FIGS. 6 to 8.

An operator (golfer) first operates the change-over switch 127 for controlling the manned or unmanned operation to set the switch at the manned operation terminal 127b, and then manipulates the handle lever 107, for example, in the right direction (direction A in FIG. 8(A)).

In this case, the handle lever 107 is swingably mounted around the ball 121 as its swing center in the arrow direction A against the spring forces of the springs 124a to 124d and the first variable resistor $VR_1$ is slidingly moved to its positive direction, so that such a positive electric signal of the direction A exceeding the neutral zone N as shown in FIG. 8(D) is applied to the steering control circuit 128. Based on a steering signal issued and received from the steering control circuit 128, the motor control signal generator 129 causes the first motor $M_1$ to be driven with a driving force, while the second motor $M_2$ is driven with a driving force smaller than that of the first motor $M_1$, with the result that the hand-operated motor-driven cart 100 can run in the desired direction.

When the operator shifts the handle lever 107 in the direction (direction B in FIG. 8(A)) opposite to that explained above, the handle lever 107 is swung around the pivotal ball 121 in the direction shown by an arrow B against the spring forces of the springs 124a to 124d and the first variable resistor $VR_1$ is slidedly moved in its negative direction, so that a negative electric signal of the direction B exceeding the neutral zone as shown in FIG. 8(D) is applied to the steering control circuit 128.

Therefore, on the basis of a steering signal issued and received from the steering control circuit 128, the motor control signal generator 129 causes the first motor $M_1$ to rotate with a driving force, while the second motor $M_2$ to rotate with a driving force larger than that of the first motor $M_1$, with the result that the hand-operated electric cart 100 can run in the left direction.

Next, when the operator shifts the handle lever 107 to the forward direction (direction C in FIG. 8(B)), the handle lever 107 is pivoted on the pivotal ball 121 in the direction shown by an arrow C against the spring forces of the springs 124a to 124d. In this case, since the first variable resistor $VR_1$ is at its neutral position and the second variable resistor $VR_2$ is slidedly moved to the positive direction, a positive electric signal of the direction C exceeding the neutral zone N as shown in FIG. 8(D) is applied to the motor control signal generator 129. This results in that the first and second motors $M_1$ and $M_2$ are driven with the same level of positive driving force and therefore the hand-operated electric cart 100 can run forwardly.

Likewise, when the operator manipulates the handle lever 107 in the backward direction (direction D in FIG. 8(B)), the handle lever 107 is swung around the pivotal ball 121 in the arrow direction D against the spring forces of the spring means 124a to 124d, so that the first variable resistor $VR_1$ is at the neutral position and the second variable resistor $VR_2$ is slidably moved to the negative direction. Thus, a negative electric signal of the direction D exceeding the neutral zone N as shown in FIG. 8(D) is applied to the motor control signal generator 129. As a result, the motors $M_1$ and $M_2$ are driven with the same level of driving force, whereby the hand-operated electric cart 100 can run backwardly.

Next, when the operator manipulates the handle lever 107 in an obliquely-forward and right direction (intermediate direction between the directions A in FIG. 8(A) and C in FIG.8(B)), the handle lever 107 is swung around the ball 121 in the intermediate direction between the directions A and C against the spring forces of the spring means 124a to 124d, so that the first variable resistor $VR_1$ is slid to the positive direction, while the second variable resistor $VR_2$ is slid also to the positive direction, whereby a positive electric signal of the direction A exceeding the neutral zone as shown in FIG. 8(D) is applied to the steering control circuit 128.

This causes a right-direction steering signal to be sent from the steering control circuit 128 to the motor control signal generator 129, in addition the second variable resistor $VR_2$ slides in the positive direction, whereby a positive electric signal of the direction C exceeding the neutral zone N as shown in FIG. 8(D) is applied to the motor control signal generator 129.

As a result, these steering signal and forward signal cause the first motor $M_1$ to be driven with a driving force larger than that given to the second motor $M_2$ thereby the motor-driven cart 100 can run in the obliquely-forward and right direction.

Even when the operator manipulates the handle lever 107 in an obliquely-forward and left direction, (intermediate direction between the direction B of FIG. 8(A) and the direction C in FIG. 8(B)), the motor-driven cart 100 can run in the obliquely-forward and left direction in the similar manner as explained above.

Meanwhile, when the operator's hand is released from the handle lever 107, the restoring forces of the above spring means 124a to 124d attached to the rotary shaft of the handle lever 107 cause the handle lever 107 to be automatically returned to a neutral zone N as shown in FIG. 8(D) and kept at that position.

Figure 7:
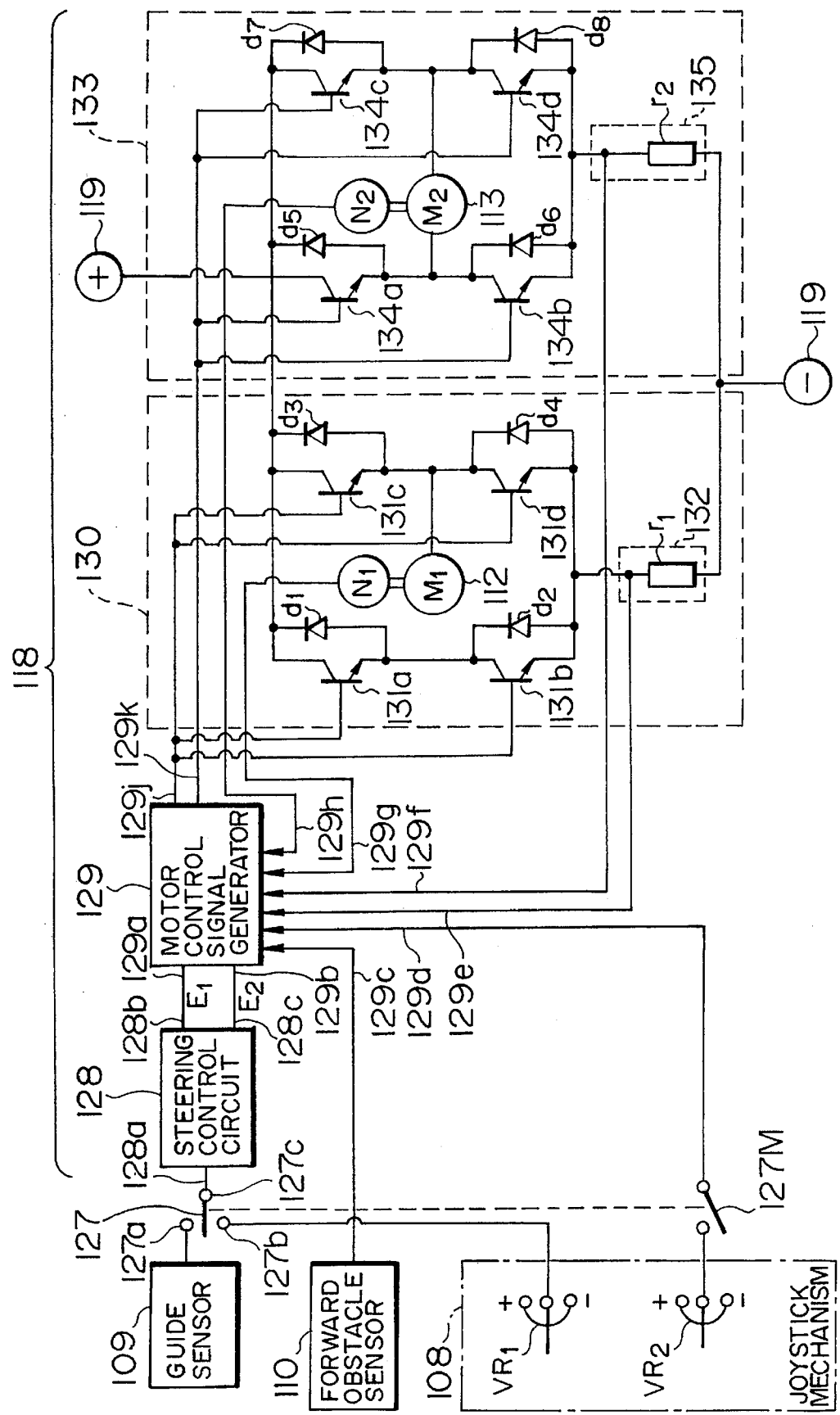
FIG. 7 is a circuit diagram showing connections among the joystick mechanism, a guide sensor, a forward obstacle sensor and the controller in the second embodiment and also showing a circuit configuration of the controller.

In this way, the first and second variable resistors $VR_1$ and $VR_2$ are mechanically and electrically coupled to the rotary shaft of the handle lever 107 having the ball 121 as its pivotal joint and these variable resisters $VR_1$ and $VR_2$ are electrically connected to the controller 118 as shown in FIG. 7, so that, when the resistive values of the variable resistors $VR_1$ and $VR_2$ vary in response to the extent of swing motion of the handle lever 107, such an electric signal (output of variable resistors $VR_1$ and $VR_2$) V as shown in FIG. 8(D) is output.

Explanation will next be made as to a motor-driven cart where a golfer loads a golf club in the motor-driven cart (which will be referred to merely as a cart, hereinafter) 100 of the present embodiment of the present invention and drives the cart on a golf course.

In this situation, therefore, four golfers as partners will put their own golf bags on each cart 100, four carts in total.

To make the explanation simple and clear, explanation will be made to the manner of drive control of only one of the four carts as representative of all the carts.

Further, when the cart 100 is used as a manned operation manner, it is possible to manipulate the handle lever 107 either by pushing or by pulling. However, explanation will be made to a case where a playing golfer (which will be referred to as the player, hereinafter) moves the cart 100 along a fairway on the golf course by pushing the handle lever 107 by his hand or hands.

First, the player takes out a golf bag 102 from the golf house and loads it on the carrier 103 of the cart 100, puts the cart 100 on a route line, turns the manned/unmanned-operation change-over switch 127 to the unmanned operation terminal 127a, and then pushes the handle lever, for example slightly forwards, this makes the cart 100, in an unmanned manner to move along the route line toward a starting point of playing, settled for the day.

When the cart 100 is designated as the top of the four carts, the operation of the stopped-position detecting sensor 111 causes the cart 100 to stop at a predetermined position in the vicinity of the start point. When the cart is one of the four carts other than the top one, the operation of the forward obstacle sensor causes the cart 100 to stop at respective position in the vicinity of the start point.

In the aforesaid unmanned operation mode, as shown in FIGS. 7 and 8, since the player does not or cannot manipulate the handle lever 107, the handle lever 107 remains in its neutral zone N and thus the respective variable resistors $VR_1$ and $VR_2$ of the joystick mechanism 108 generate no signals. However, on the basis of an operation signal from the guide sensor 109, the first and second motors $M_1$ and $M_2$ are driven under the operational control of the motors based on rotation signals issued from the output terminals 128b and 128c of the steering control circuit 128 and also by a speed control signal of a constant driving force issued from the motor control signal generator 129 to thereby drive the cart 100, whereby the cart 100 can be smoothly run along the route line.

When the cart 100 arrives at the start point, the player takes out a golf club he wants use from the golf bag and hits the first ball, thereafter the player can either turn the change-over switch 127 to the manned operation terminal 127b and remove the cart from the route line to run the cart, or can continue the unmanned operation of the cart as far as the next stop point without changing the change-over switch 127.

When the player pushes the handle lever 107 toward direction C, the second variable resistor $VR_2$ of the joystick mechanism 108 sends a positive electric signal of the forward direction to the motor control signal generator 129 of the controller 118, the motor control signal generator 129 in turn issues positive drive signals of an equal level to the first motor control circuits 130 and the second motor control 133 to generate positive electric signals within a range shown by a symbol C in FIG. 8(D), thus driving the motors $M_1$ and $M_2$ in their forward direction. As a result, the cart 100 is accelerated by a combination of the motor driving forces and the player's pushing force so that the cart 100 can run in the forward direction corresponding to the manipulation direction of the handle lever 107.

When the cart now comes to a position of the golf ball hit by the player, the handle lever 107 is automatically shifted to the neutral zone N by the player's release of the handle lever 107 thereby the driving force from the controller 118 is lost, whereby the motors $M_1$ and $M_2$ stops and thus the cart 100 stops.

In this way, the player continues to play by hitting the second and then third ball.

When the player wishes to increase the driving force in an uphill slope course, the player can grip the handle lever 107 and shift it forwardly to a large extent. Thus, the amount of forward pivotal motion of the handle lever 107 is automatically increased.

In other words, since the value of an electric signal in the range C of FIG. 8(D) is increased in the positive direction and thus the rotational speed (driving force) of the motors $M_1$ and $M_2$ is increased under control of the controller 118, the cart 100 can easily ascend the steep uphill slope, if only the player pushes the handle lever 107 in conscious of the uphill slope, with a lighter burden by the player aided by the driving force of the cart.

Next, where the ball bounds backward by hitting against a tree or it becomes necessary to move the cart 100 backwards to go to the next course, the player pulls the handle lever 107 in the direction D. As a result, a signal issued from the controller 118 causes such an electric output signal as shown in FIG. 8(D) to have a negative value as shown by the range D, whereby both the motors $M_1$ and $M_2$ are driven reversely and the cart 100 can move backwards.

Even in this case, when it is desired to stop the cart 100, the player releases his/her hand from the handle lever 107. This causes the handle lever 107 to be automatically returned to the neutral zone N, so that both the motors $M_1$ and $M_2$ stop and thus stop the cart 100.

Further, even when the player pulls the handle lever 107 to reverse the respective motors $M_1$ and $M_2$ to thereby drive the cart 100 backwards, the driving force is increased in proportion to the extent of swing motion of the handle lever 107 is substantially the same as when the player pushes the handle lever 107, except the difference in the direction of the driving force.

When the player having finished a play for one course in this way and wants to go to the next course, the player shifts the handle lever 107 toward, for example, the rightward of the route line to turn the cart body 100 toward its right direction and then to move the cart 100 as far as the vicinity of the route line. Further, the player turns the change-over switch 127 to the unmanned operation terminal side 127a to automatically run the cart 100 along the route line as far as the start point of the next course.

In substantially the same manner as mentioned above, the cart 100 is driven along each course. After the player having finished all of all the course, the player brings the cart 100 back at a predetermined place of the golf field.

Although the motor-driven cart of the second embodiment has been explained in connection with the case where the cart is used as a one-person golf club cart in the golf field, the motor-driven cart of the present embodiment is not limited to such a specific application, but may be used in various uses, e.g., as a cart for carrying parts or goods along an unmanned running path laid between factories or as a air-terminal baggage transportation cart to be moved along an unmanned running path laid between a warehouse and a cloak room of an air terminal.

Further, in the aforesaid embodiment used in a golf course, explanation has been made to the case where player's pushing of the handle lever causes the forward running of the cart while player's pulling of handle lever causes the backward running of the cart.

However, another way of using may be employed that the connection between the handle lever and variable resistor $VR_2$ is changed to reverse the manipulation directions C and D of the handle lever shown in FIG. 8(B), which results in that player's pushing of the handle lever 107 causes backward moving of the cart while player's pulling of the handle lever 107 causes forward moving of the cart.

Furthermore, various modifications may be possible including such a case that, in place of the transistors 131a to 131d and 134a to 134d within the controller 118, such elements as relays are employed to be turned ON and OFF as in the above transistors.

(Embodiment 3)

Figure 9:
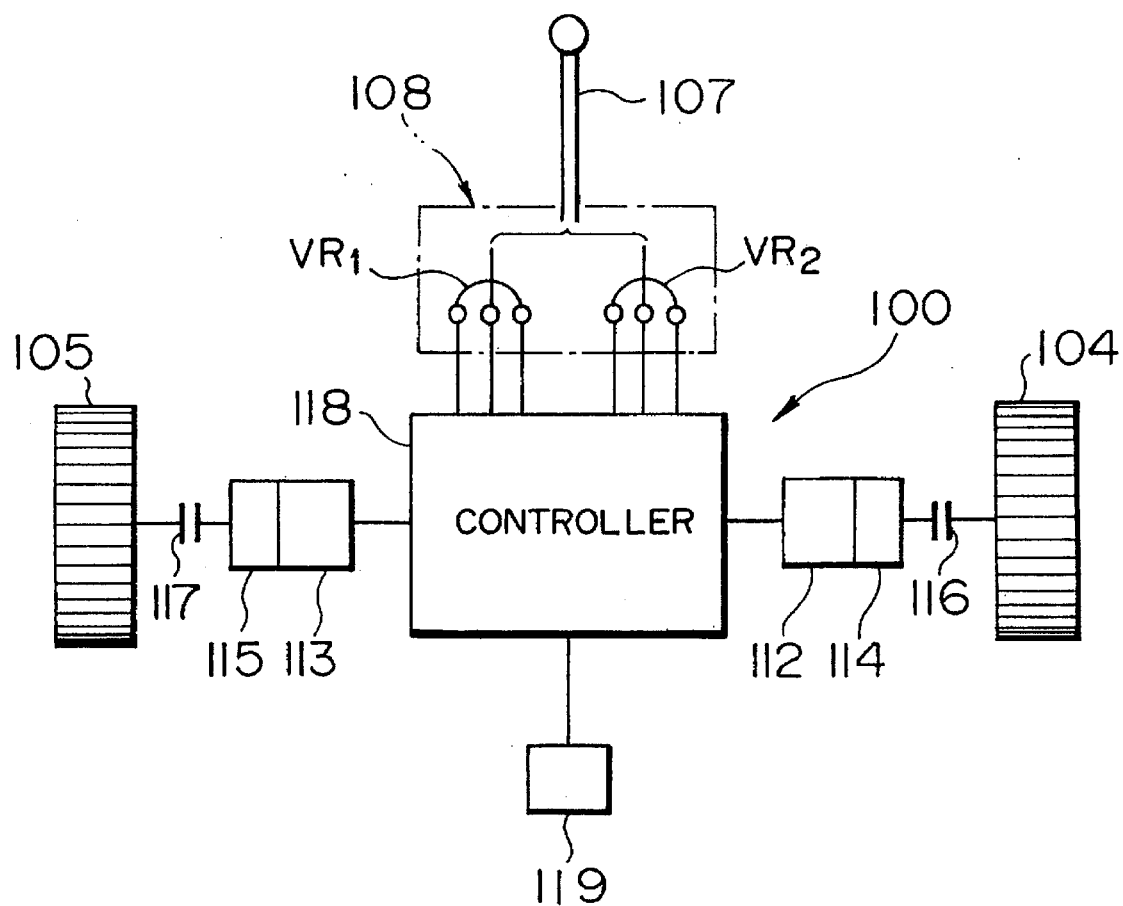
FIG. 9 is a circuit diagram showing a major part of a motor-driven cart in accordance with a third embodiment of the present invention and also showing a schematic circuit diagram of a control unit.
Figure 10:
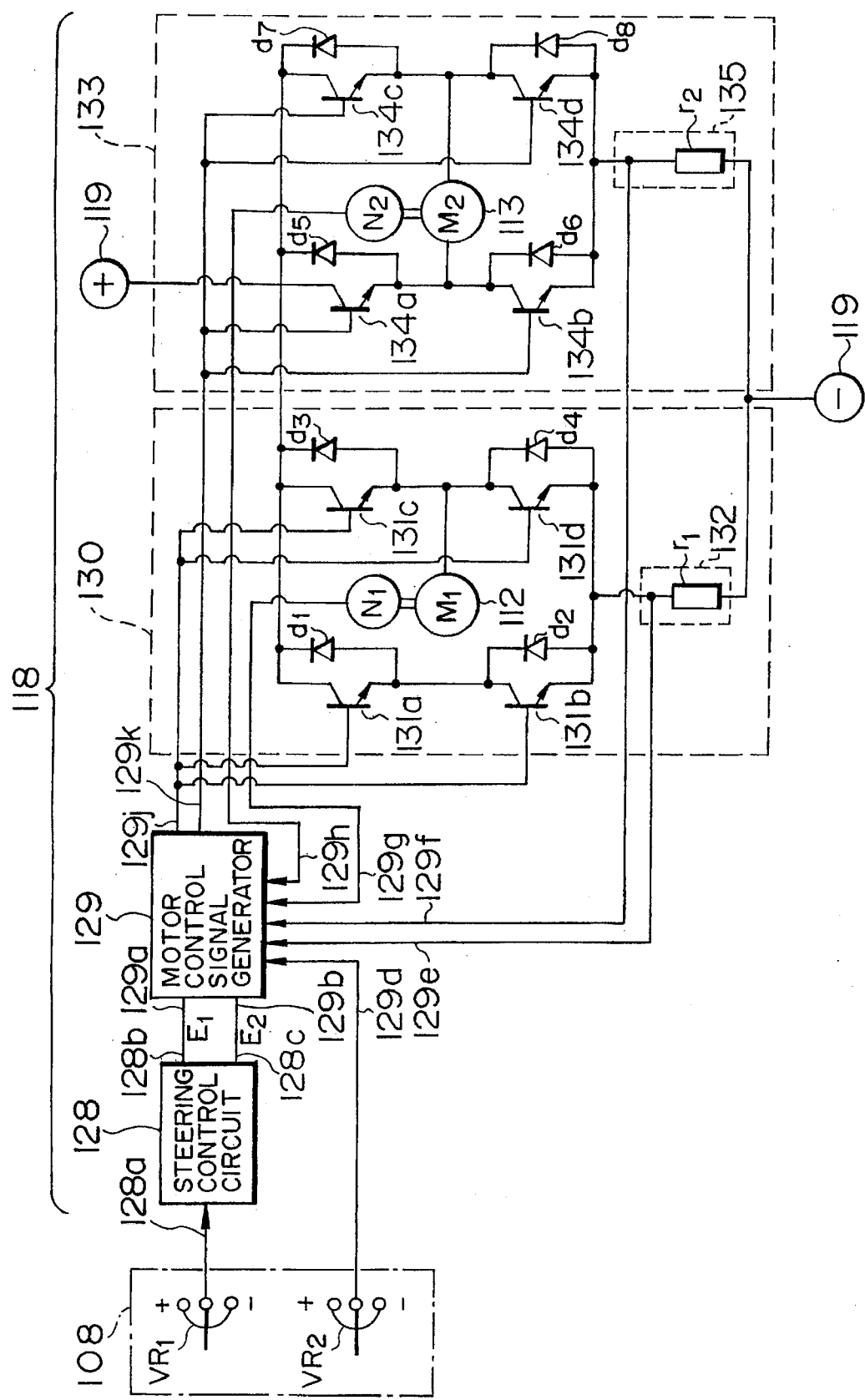
FIG. 10 is a circuit diagram showing connections between a joystick mechanism and a controller in the third embodiment and also showing a circuit configuration of the controller.
Figure 11:
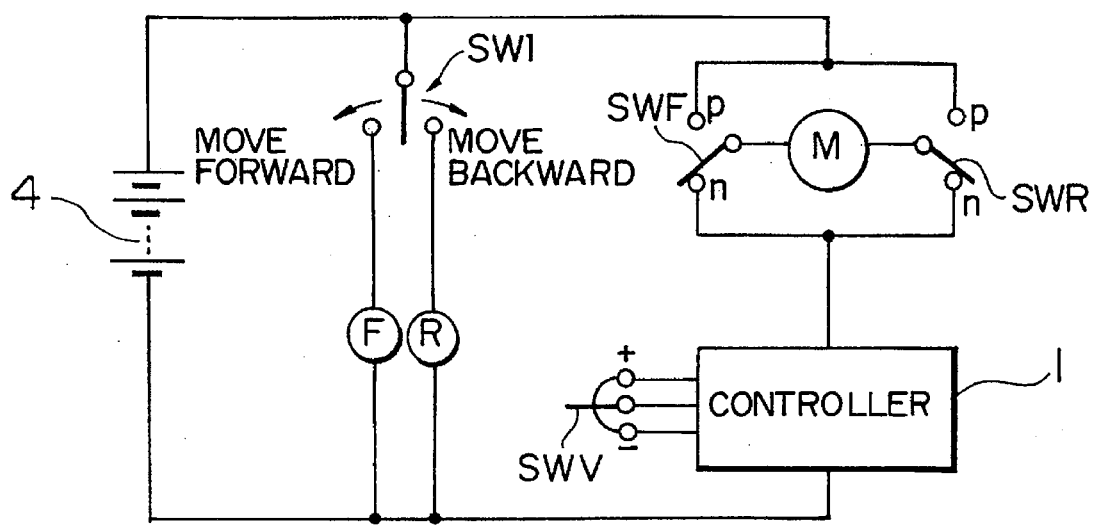
FIG. 11 is a circuit diagram, in block diagram form, of a prior art motor-driven cart.

The present embodiment is constructed as shown in FIGS. 9 and 10.

As can be seen by comparing these FIGS. 9 and 10 and FIGS. 5 and 7, the present embodiment has omitted the following elements, that is, the guide sensor 109, forward obstacle sensor 110, manned-/unmanned operation change-over switch 127, manned operation switch 127M, steering control circuit 128 associated therewith, and the wiring to the motor control signal generator 129 in the second embodiment.

Accordingly, since the present embodiment performs exactly the same action as the second embodiment excepting the provision of unmanned running function along the route line, as alone by the second embodiment detailed explanation thereof is omitted and it will be sufficient to say that the present embodiment is directed to such a cart that carries baggages or goods and a user can move the cart in a desired direction easily by electric power by manipulating lever 107.

It is to be added, the motor-driven cart of the present embodiment is featured in that the present embodiment can be manufactured more inexpensively than the second embodiment and can be effectively used in a field which requires unmanned running so strongly, e.g., as a shopping cart in a supermarket or a baggage transportation/carrier cart in an air terminal.

In operation of the motor-driven cart in accordance with the present invention, a positive or negative electric signal of a level corresponding to the amount of swing motion of the handle lever swingably provided in the main body of the motor-driven cart around a pivotal point is generated, thereby the control of the forward/reverse rotation and accelerating or decelerating rotational speed of the electric motors is carried out according to the generated electric signal.

Therefore, the motor-driven cart is imparted a driving force in response to a user's pulling or pushing operation of the handle lever against the restoring forces of the spring means provided to the handle lever, the motor-driven cart is caused to slowly receive the above auxiliary driving force from the motors in the pulled or pushed direction, whereby the operator can move the motor-driven cart at the operator's own intention in a natural manner.

Further, when it is desired to drive the cart along a steep uphill slope, since the user will pull the handle lever toward rearward or pushes it away to a large extent against the restoring forces of the spring, the rotational speeds of the electric motors can be increased greatly in response to their positive or negative direction, thus resulting in that the motor-driven cart can readily move up along the steep uphill slope.

Also, even when it is desired for the cart to descend along a steep downhill slope, the operator has only to pull the handle lever slightly rearward. Since this causes the handle lever to be returned to the neutral zone by the restoring force of the spring, this returning force acts to brake the natural descending force of the motor-driven cart, which results in that the motor-driven cart can smoothly run down even such a steep downhill slope.

When it is required to stop the motor-driven cart, if the operator's hand is released from the handle lever, this causes the handle lever to automatically return to the neutral zone by the restoring force of the spring, whereby the motor-driven cart can be stopped.

In this way, the motor-driven cart of the present invention has such a feature that the cart can be accelerated or decelerated by positive or negative auxiliary driving force following the operator's manipulation.

Meanwhile, when the motor-driven cart has a function of going leftward or rightward as well as unmanned running along a previously set route, such a cart can be suitably used, in particular, for carrying a golf bag on golf courses and can be operated as follows.

When the motor-driven cart is driven on a half way road between courses not used for playing golf, the player can move the cart along the route in the unmanned operation manner; whereas when the motor-driven cart is driven within the playing courses, the player turns the switch to its manned operation side, dismounts the cart from the route line, and drives the cart by motors under control of the player's manipulation as follows.

That is, when the player shifts the handle lever swingably equipped in the main body of the motor-driven cart in one of desired predetermined directions of left, right, forward and backward, the motor-driven cart carrying the golf bag can run toward the shifted direction. In this case, a positive or negative electric signal of a level corresponding to the extent of swing motion of the handle lever which makes the cart to go toward the shifted direction, is generated so that the forward/reverse rotation and accelerating or decelerating the rotational speed of the electric motors are controlled in accordance with the generated electric signal. Thus, when the player shifts the handle lever against the restoring force of the spring means provided on the handle lever, a driving force by the motors and corresponding to the manipulated direction of the handle lever is imparted to the motor-driven cart, whereby the operator is able to move the motor-driven cart smoothly to the desired direction.

Even when it is desired to run the motor-driven cart along a steep uphill or downhill slope, the motor-driven cart can be smoothly driven in the same manner as mentioned above.

When the operator wishes to stop the motor-driven cart, it is required that the operator merely release his/her hand from the handle lever.

In this way, the motor-driven cart having the manipulation control for left and right direction and the unmanned running function is suitable for a cart as a single-person golf bag cart so that the cart can be accelerated or decelerated in the forward, backward, leftward or rightward direction based on the positive or negative motor drive force following the operator's manipulation of the handle lever in the desired direction, or the cart can be driven an unmanned operation mode along the route line laid between the courses.

Further, the motor-driven cart having no unmanned running function but having a function of allowing the operator to manipulatably drive the cart in the forward, backward, leftward or rightward direction can realize substantially the same action as mentioned above except for the unmanned running operation.

(Meritorious Effects of the Invention)

Since the motor-driven cart of the present invention is arranged as mentioned above, the cart has excellent meritorious effects as follows.

(1) The handle lever and variable resistors, which form a major part Of the operation of the present invention, are mechanically and electrically connected to each other and are also associated with the subsequent stage of circuit so that speed control can be effected according to the extent of swing motion exerted to the handle lever, whereby the speed control of the forward and backward movement of the motor-driven cart can be automatically carried out as being operatively interlinked with operator's pushing or pulling operation of the handle lever.

Therefore, the present invention can relieve such an operators work to operate an ON/OFF switch or to provide a speed control signal as done in the prior art, and thus more easy manipulation can be attained.

(2) Since the motor-driven cart of the present invention can receive an auxiliary driving force in proportion to the operator's pushing or pulling force, the operator can freely run the cart at a reasonable speed, not too fast and not too slow without feeling any appreciably increased weight of the baggage placed on the cart.

(3) When the motor-driven cart of the invention is constructed to have the added function to allow leftward and rightward manipulation control as the second or third embodiment, since not only the leftward or rightward turning of the cart body but also the obliquely-forward and backward motion, and leftward and rightward advancement can be electrically carried out, the operator can easily transport the baggage to a desired location.

(4) Since the second embodiment is further provided with an unmanned running function, when the cart is used as a cart on a golf course for carrying golf bag or a single person, the total number of caddies in the golf facility can be remarkably reduced.

(5) Having the above remarkable features, the motor-driven cart of the present invention can be used having high serviceability not only as a cart for golf courses having many uphill or downhill slopes but also as other kinds of carts usable in various fields such as carts for carrying goods in a factory, shopping carts in a supermarket, and baggage carts in air terminals.

What is claimed is:

1. A motor-driven cart comprising:

a first and a second motor for driving wheels of said cart;

a handle lever disposed on a main body of said cart so as to be capable of being swung by a predetermined angle in selected one of left, right, forward, and backward, and obliquely right and left in both forward and backward directions;

means for generating electric signals for steering and for controlling the speeds of said first and second motors in response to an extent of swing motion of said handle lever, whereby said first and second motors are put in their stopped state when said handle lever is in its neutral zone, while when said handle lever is swung in selected one of the left, right, forward, backward and any other desired horizontal directions outside said neutral zone, said first and second motors are increased in their rotational speeds in a forward or reverse direction in response to the direction and extent of swing motion applied to said handle lever so as to carry out speed control of said cart in the selected one of left, right, forward, backward and any other desired horizontal directions;

a guide sensor;

a sensor for detecting a forward obstacle; and a manned/unmanned operation change-over switch, whereby when an operator changes said manned/unmanned operation change-over switch to its unmanned operation side and puts said motor-driven cart onto a previously-laid route line, said cart can be driven at a predetermined speed along said previously laid route line, and when said forward obstacle sensor detects presence of such an obstacle as another motor-driven cart stopping forward of said route line, said motor-driven cart is stopped at a place spaced apart from said obstacle at a predetermined distance, while when the operator changes said manned/unmanned change-over switch to its manned operation side, said motor-driven cart can run to an arbitrary place away from said route line in accordance with an operator's swing manipulation of said handle lever.

2. A motor-driven cart as set forth in claim 1, wherein said handle lever is equipped with a spring for returning said handle lever to its neutral zone by its restoring force, whereby when an external force as a pulling or pushing action of an operator is exerted to said handle lever, said handle lever is swung in a positive or negative direction against the restoring force of said spring, while when no such external force is applied to said handle lever, said handle lever is kept in said neutral zone nearly in the middle of the rotation of said handle lever under the influence of the restoring force of said spring.

3. A motor-driven cart as set forth in claim 1, wherein said handle lever is supported by four springs arranged to surround said handle lever for returning said handle lever to its neutral zone by their restoring forces, whereby when said handle lever is swung by an external force to one of the left, right, forward, backward and any other desired horizontal directions, said handle lever is swung in a positive or negative direction against the restoring forces of said springs, while when no such external force is applied to said handle lever, said handle lever is returned to said neutral zone nearly in the middle of the swing motion of said lever by the restoring forces of said springs.

4. A motor-driven cart as set forth in claim 1, wherein switching of said motors between the forward and reverse rotations is carried out by formation of a forward or reverse circuit for the motors effected by actuation of forward and backward elements in response to positive or negative swing movement of said handle lever exceeding said neutral zone.

5. A motor-driven cart as set forth in claim 1, wherein said handle lever is mechanically and electrically coupled to variable resistors, whereby resistive values of said variable resistors are increased/decreased in response to the extent of swing motion in a positive/negative direction of said handle lever so that said electrical signals are generated as positive/negative signals.

6. A motor-driven cart as set forth in claim 5, wherein said means for generating the electric signals for steering and for speed control in response to a swing movement of said handle lever includes a joystick mechanism for actuating said variable resistors in response to the direction and extent of force of manipulation of said handle lever, a steering control circuit actuated by a signal from said joystick mechanism or from said guide sensor, and a motor control signal generator, whereby said electric signals are generated from said joystick mechanism, said steering control circuit, and said motor control signal generator and further from said forward obstacle sensor if occasion demands.

7. A motor-driven cart comprising;

a plurality of electric motors for driving wheels of said cart;

means for generating an electric signal in operative response to an extent of swing motion imparted to a handle lever provided to a main body of said cart so as to be swingably operative at least in forward and backward directions, whereby when said handle lever is placed in a neutral zone, said motors are put in their stopped state, while when said handle lever is swung to a position outside said neutral zone, said motors are increased in their rotational speeds in a forward or reverse direction in response to the direction and extent of swing motion applied to said handle lever;

a guide sensor;

a sensor for detecting a forward obstacle; and a manned/unmanned operation change-over switch, whereby when an operator changes said manned/unmanned operation change-over switch to its unmanned operation side and puts said motor-driven cart onto a previously-laid route line, said cart can be driven at a predetermined speed along said previously laid route line, and when said forward obstacle sensor detects presence of such an obstacle as another motor-driven cart stopping forward of said route line, said motor-driven cart is stopped at a place spaced apart from said obstacle at a predetermined distance, while when the operator changes said manned/unmanned change-over switch to its manned operation side, said motor-driven cart can run to an arbitrary place away from said route line in accordance with an operator's swing manipulation of said handle lower.

8. A motor-driven cart as set forth in claim 7, wherein said handle lever is equipped with a spring for returning said handle lever to its neutral zone by its restoring force, whereby when an external force as a pulling or pushing action of an operator is exerted to said handle lever, said handle lever is swung in a positive or negative direction against the restoring force of said spring, while when no such external force is applied to said handle lever, said handle lever is kept in said neutral zone nearly in the middle of the rotation of said handle lever under the influence of the restoring force of said spring.

9. A motor-driven cart as set forth in claim 7, wherein switching of said motors between the forward and reverse rotations is carried out by formation of a forward or reverse circuit for the motors effected by actuation of forward and backward elements in response to positive or negative swing movement of said handle lever exceeding said neutral zone.

10. A motor-driven cart as set forth in claim 7, wherein said handle lever is mechanically and electrically coupled to variable resistors, whereby resistive values of said variable resistors are increased/decreased in response to the extent of swing motion in a positive/negative direction of said handle lever so that said electrical signals are generated as positive/negative signals.

* * * * *